Jan. 4, 1944. J. W. JAGERSBERGER 2,338,183
INTERNAL COMBUSTION ENGINE
Filed Jan. 22, 1942 2 Sheets-Sheet 1
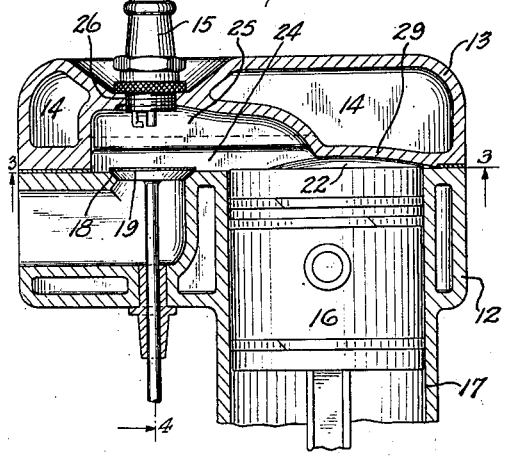
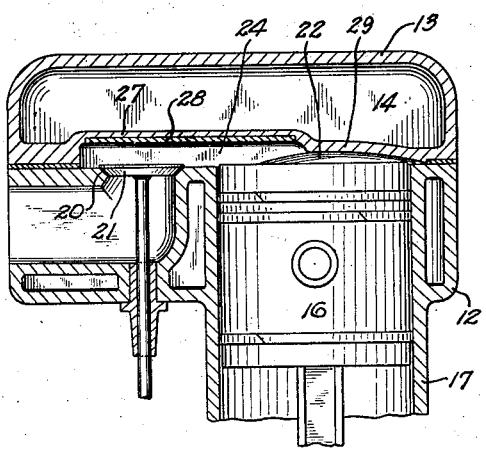
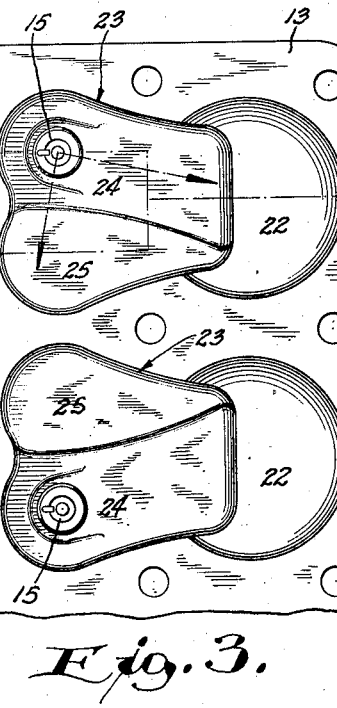
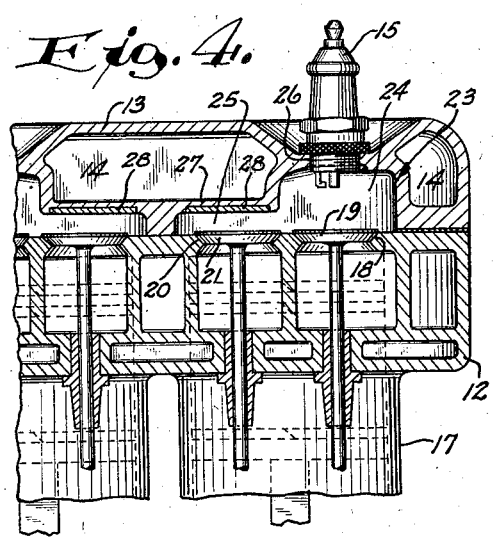
INVENTOR.
BY Joseph W. Jagersberger
Morsell & Morsell
ATTORNEYS.

Jan. 4, 1944.  J. W. JAGERSBERGER  2,338,183
INTERNAL COMBUSTION ENGINE
Filed Jan. 22, 1942  2 Sheets-Sheet 2
Fig. 5.
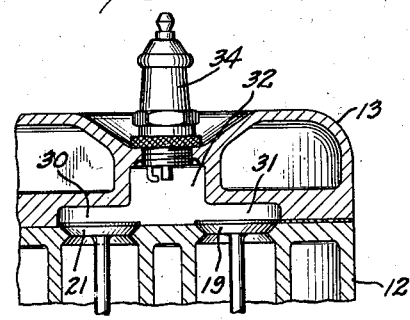
Fig. 7.
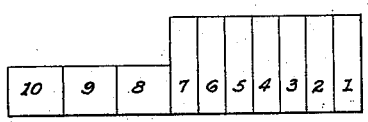
Fig. 8.
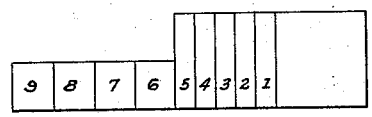
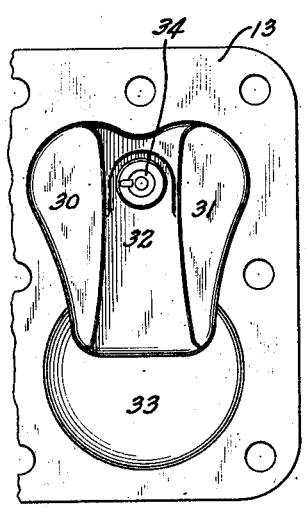
Fig. 6.
Fig. 9.
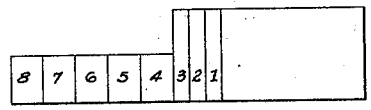
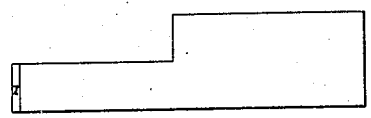
Fig. 10.
INVENTOR.
Joseph W. Jagersberger
BY
Morrell & Morrell
ATTORNEYS.

Patented Jan. 4, 1944

2,338,183

UNITED STATES PATENT OFFICE 2,338,183

INTERNAL COMBUSTION ENGINE

Joseph W. Jagersberger, Racine, Wis., assignor to Rajo Motor Company, Racine, Wis., a corporation of Wisconsin Application January 22, 1942, Serial No. 427,711

6 Claims. (Cl. 123—191)

This invention relates to improvements in internal combustion engines, and more particularly to an improved cylinder head construction.

It has heretofore been proposed, in the heads of internal combustion engines, to have a shallow clearance space over the cylinder which communicates with a side recess or pocket of greater depth than said clearance space, the said recess being over both the intake and exhaust valves and forming a main combustion chamber. This type of head is generally referred to as the L type. Difficulties, however, have been encountered in connection with detonation of that portion of the charge which is last to burn, and in connection with explosion shock when a high compression ratio is used. Detonation usually results from failure to properly cool the last unburned portion of the charge. This portion, in the usual head construction, is compressed into the clearance space and comes into contact with the hot piston head, offsetting the cooling tendency of the top water cooled wall of the shallow cooling space. As a result there is a marked knocking or detonation in spite of the attempt to utilize the clearance space for cooling.

It is a general object of the present invention to obviate the objectionable features of conventional structures by providing a novel combustion chamber design wherein the shape of said chamber cooperates in a novel manner with the position of the intake and exhaust valves, and with the position of the spark plug, to provide for an auxiliary cooling zone in addition to the usual clearance space to thereby obtain effective cooling of the last unburned portion of the charge and to obtain more efficient combustion without detonative tendencies or shock, the construction nevertheless permitting the effective use of high compression ratios.

A more specific object of the invention is to provide a construction of the class described wherein the combustion chamber is shaped to provide, in addition to the usual clearance space, a shallow, highly cooled auxiliary chamber having a high ratio of surface area to volume, positioned remotely from the spark plug, to cool the last portion of the charge.

A further object of the invention is to provide a construction as above described wherein the shallow auxiliary chamber is located remotely from the exhaust valve and over the intake valve so that the latter is kept relatively cool because of its proximity to the upper water cooled wall of said shallow auxiliary chamber, and so that the incoming comparatively cool charge will aid in reducing the temperature of said wall.

Other objects of the invention are to provide a head construction wherein there is directional firing; wherein detonation and shock are eliminated without loss of power; wherein there are two independent cooling areas, one the usual clearance space over the cylinder, and the other the novel auxiliary chamber over the intake valve, which cooling areas are located at approximately right angles from each other with the spark plug at the apex of the angle; wherein the hottest gas is burned first because of the location of the spark plug above the exhaust valve head; wherein the chamber over the exhaust valve is of greater depth than in standard practice to accommodate a greater volume of the charge near the spark plug and over the exhaust valve; and wherein the concentration of said greater volume of the charge near the spark plug and exhaust valve causes the gas to burn faster and the flame to get off to a quicker start to progress into the two cooling areas where the flame speed is then reduced so that an excessively quick pressure rise with resulting shock tendencies is avoided.

With the above and other objects in view, the invention consists of the improved internal combustion engine, and all its parts and combinations as set forth in the claims, and all equivalents thereof.

In the accompanying drawings illustrating one complete embodiment of the preferred form of the invention, in which the same reference numerals designate the same parts in all of the views, Fig. 1 is a transverse vertical sectional view through the head and upper portion of the cylinder block, taken approximately on line 1—1 of Fig. 3;

Fig. 2 is a transverse vertical sectional view taken approximately on line 2—2 of Fig. 3;

Fig. 3 is a fragmentary view, looking at the bottom of the head, taken approximately on line 3—3 of Fig. 1;

Fig. 4 is a fragmentary longitudinal vertical sectional view taken approximately on the line 4—4 of Fig. 1;

Fig. 5 is a view similar to Fig 4, illustrating a modified construction.

Fig. 6 is a view looking at the bottom of the head in the construction of Fig. 5; and Figs. 7 to 10, inclusive, are diagrammatic views showing how the burning of the charge in the combustion chamber progresses.

Referring more particularly to the drawings, the numeral 12 designates a cylinder block, and the numeral 13 the head therefor. The head is formed with the usual cooling chambers 14 and is equipped with spark plugs 15. In the block are the usual pistons 16 operating in cylinders 17. There are also exhaust ports 18 controlled by exhaust valves having heads 19 and intake ports 20 controlled by intake valves having heads 21.

On the lower side of the head 13 is a relatively shallow dished clearance space 22 over each of the pistons 16, and the clearance space merges into the combustion chamber 23. In the usual construction the combustion chamber is of approximately uniform depth in a cross-section such as the cross-section of Fig. 4. With the present invention, however, the combustion chamber comprises two parts, a main chamber portion 24 and an auxiliary chamber 25. The main chamber 24 is of greater depth than the conventional depth of combustion chambers, and the auxiliary chamber 25 is relatively shallow. The auxiliary chamber extends approximately half way across the valve pocket as viewed in Fig. 4, and preferably overlies the full diameter of the intake valve head 21. The auxiliary chamber 25 is made no deeper than is necessary in order to permit a desired clearance over the valve head 21 when the valve is wide open.

The threaded opening 26 for the spark plug 15 is located at the end of the main chamber 24 remote from the clearance space 22, as shown in Fig. 1, and the spark plug opening 26 is also preferably directly over the exhaust valve head 19.

In order to further reduce the temperature of the upper wall 27 of the auxiliary chamber an insert of metal 28 having a higher heat conductivity than the metal used for the cylinder head proper may be utilized.

In order to understand how the novel shape and arrangement of the combustion chamber eliminates detonation it is necessary to understand the action of the charge of fuel as it is being fired. Referring to Fig. 7, which diagrammatically represents a combustion chamber having a relatively deep main chamber 24 and a relatively shallow auxiliary chamber 25, the unburned charge is divided into ten parts numbered 1 to 10 inclusive. When this charge is fired by the spark plug, which in the present invention is located over the deep portion 24 of the combustion chamber, that portion which is nearest to the plug is first to be burned. As the charge burns, the temperature, volume, and pressure increase, thereby compressing the unburned portion of the charge, as illustrated in Fig. 8 wherein there are nine unburned portions remaining. Fig. 9 illustrates further compression of the unburned portions of the charge, there being eight unburned portions left in said figure. In Fig. 10 nine-tenths of the charge has already been burned, and that portion is back to practically its original volume of Fig. 7. The remaining one-tenth which is still unburned has been very highly compressed as compared with its initial condition in Fig. 7. It is evident that the temperature of this unburned gas is continually increased during combustion because of its compression, which is in effect a continuation of the compression imposed by the piston movement. The object of the present invention is to maintain the temperature of the last unburned portion, as shown in Fig. 10, below the critical temperature of detonation for the given fuel. While this temperature depends to some extent on pressure, this is a relatively minor feature as is proven by the great amount of throttling necessary to eliminate any appreciable degree of detonation. The only practical way of controlling the temperature of the last unburned portion without sacrificing power lies in proper cooling of said unburned portion of the charge during combustion, and efficiency considerations demand that this cooling effect be highly localized with respect to the unburned gas so as to avoid excessive heat loss from the burning charge as a whole.

In the ordinary head construction the last unburned tenth of the charge, as shown in Fig. 10, is compressed into the clearance space 22 above the cylinder. This clearance space, however, does not provide successful cooling to eliminate detonation; the reason for this is that the top of the piston is hot and this offsets the effect of the water cooled wall portion 29 above the clearance space in cooling the unburned portion of the charge.

With the present invention, however, the auxiliary chamber 25 is provided, and the arrangement is such that this is approximately the same distance away from the spark plug as the edge of the clearance space 22. It is also apparent that the main portion of the auxiliary chamber 25 and the clearance space 22 are located at approximately right angles from each other, as indicated by the arrows in Fig. 3, with the spark plug 15 at the apex of the angle. Thus two cooling areas are provided for the last unburned portion of the charge, which are both located remotely from the spark plug and remotely from the relatively hot exhaust valve head 19. The shallow auxiliary chamber 25 provides for efficient cooling of the last unburned portion of the charge because there is a high surface area with relation to volume so that the maximum cooling effect is obtained from the water cooled top wall 27 of this chamber. In addition the proximity of the head 21 of the intake valve to the water cooled wall 27 maintains the head of the intake valve relatively cool so that the floor of the auxiliary chamber 25 also exerts a cooling effect as distinguished from the hot bottom of the clearance space 22 formed by the top of the hot piston. In addition the upper wall 27 of the auxiliary chamber 25 is so located that the incoming comparatively cool charge flows over said wall and reduces the temperature thereof. The auxiliary chamber 25 is also cool because of its remote position from the spark plug and exhaust valve. It is apparent, therefore, that with the present construction reliance is not placed solely upon the clearance space 22 for cooling, but that there is an additional cooling zone comprising the auxiliary chamber 25, which is far more effective than the clearance space, so that the temperature of the last unburned portion of the charge is maintained below the critical temperature of detonation.

By having the main chamber 24 over the exhaust valve of such depth that it contains a greater amount of the charge than in standard practice, a considerable volume of the charge is in the spark plug area, and this portion being near the exhaust valve is relatively hot. The flame, therefore, gets off to a quicker start, and as the flame front progresses into the two cooling areas 22 and 25 the flame speed is reduced and excessively quick pressure rise and consequently shock or rough running is avoided. This shock tendency is an objectionable feature of ordinary construction and manifests itself in deflections of the load supporting members of the engine. This results in objectionable noise and vibration and may seriously shorten the life of the bearings.

The construction is also such, due to the shape of the combustion chamber, that there is a desirable turbulence in the main chamber 24 inducing greater all around efficiency.

In the modification illustrated in Figs. 5 and 6 there are two relatively shallow auxiliary chambers 30 and 31 in addition to the main chamber 32, and the main chamber is located approximately centrally of the two auxiliary chambers and is of substantially greater depth, as illustrated in Fig. 5. The two auxiliary chambers 30 and 31 are provided in addition to the clearance space 33. The spark plug 34 is located in the end of the main chamber away from the clearance space. In this form of the invention the chamber 30 is over the intake valve and the chamber 31 is over the exhaust valve. This renders the chamber 31 less effective than the chamber 30 for cooling purposes, but the construction is very advantageous as compared with conventional designs.

As a result of the present invention a substantial increase in compression ratios is possible without objectionable detonation or shock. It is also found that because of the depth and location in the main chamber approximately sixty (60%) per cent of the charge is fired instantly. Due to the use of the shallow auxiliary chamber, in addition to its main advantage it is found that the clean-out on the exhaust stroke is much better than in conventional designs.

Although only two forms of the invention have been shown and described, it is obvious that various changes and modifications may be made without departing from the spirit of the invention, and all of such changes are contemplated as may come within the scope of the claims.

What I claim is:

1. In an internal combustion engine, a cylinder, a piston operating therein, a head formed with a combustion chamber, said chamber having a shallow portion over the cylinder and having a portion lying to one side of and opening into said cylinder, inlet and exhaust valves arranged side by side adjacent said cylinder and opening into said side combustion chamber portion, said side combustion chamber portion having a main chamber part of relatively great depth extending transversely of the head toward the cylinder and having a relatively shallow part over the inlet valve extending transversely of the head toward the cylinder, and a spark plug mounted in the end of said main deep chamber part which is remote from the cylinder, said deep main chamber part being in direct communication with the cylinder so that ignited gases may travel simultaneously in two directions toward relatively shallow combustion chamber parts, one direction being in a relatively straight line toward the shallow combustion chamber portion over the cylinder and the other direction being in a relatively straight line toward the relatively shallow side combustion chamber part.

2. In an internal combustion engine, a head provided with a combustion chamber, there being inlet and exhaust valves opening into said chamber, said chamber having a main chamber portion of relatively great depth adjacent the exhaust valve and having an auxiliary chamber portion of relatively shallow depth adjacent the inlet valve, said combustion chamber also including a clearance space portion of less depth than said auxiliary chamber located over the cylinder and communicating with said main and auxiliary chamber portions, and a spark plug mounted in said relatively deep main chamber portion over said exhaust valve.

3. In an internal combustion engine, a cylinder, a piston operating therein, a head formed with a combustion chamber, said chamber having a shallow portion over the cylinder and having a portion lying to one side of and opening into said cylinder, inlet and exhaust valves arranged side by side adjacent said cylinder and opening into said side combustion chamber portion, said combustion chamber portion having a main chamber part of relatively great depth over the exhaust valve and extending transversely of the head toward the cylinder and having a relatively shallow part over the inlet valve extending transversely of the head toward the cylinder, and a spark plug mounted in the end of said deep main chamber part which is remote from the cylinder, said deep main chamber part being in direct communication with the cylinder so that ignited gases may travel simultaneously in two directions toward relatively shallow combustion chamber parts, one direction being in a relatively straight line toward the shallow combustion chamber portion over the cylinder and the other direction being in a relatively straight line toward the relatively shallow side combustion chamber part.

4. In an internal combustion engine, a cylinder, a piston operating therein, a head formed with a combustion chamber, said chamber having a shallow portion over the cylinder and having a portion lying to one side of and opening into said cylinder, inlet and exhaust valves arranged side by side adjacent said cylinder and opening into said side combustion chamber portion, said combustion chamber portion having a main chamber part of relatively great depth over the exhaust valve and extending transversely of the head toward the cylinder and having a relatively shallow part over the inlet valve extending transversely of the head toward the cylinder, and a spark plug mounted in the end of said deep main chamber part which is remote from the cylinder, the vertical axis of the cylinder, the vertical axis of the intake valve, and the vertical axis of the spark plug being arranged triangularly with respect to one another, and the relatively deep exhaust valve and spark plug accommodating part of the side combustion chamber being in direct communication with the cylinder so that igniting gases may travel simultaneously in two directions toward relatively shallow combustion chamber parts, one direction being in a relatively straight line toward the shallow combustion chamber portion over the cylinder and the other direction being in a relatively straight line toward the relatively shallow side combustion chamber part.

5. In an internal combustion engine, a cylinder, a piston operating therein, a head formed with a combustion chamber, said chamber having a shallow portion over the cylinder and having a portion lying to one side of and opening into said cylinder, inlet and exhaust valves arranged side by side adjacent said cylinder and opening into said side combustion chamber portion, said combustion chamber portion having a main chamber part of relatively great depth extending transversely of the head toward the cylinder and having a relatively shallow part on each side of said main chamber part extending transversely of the head toward the cylinder, and a spark plug mounted in the end of said relatively deep main chamber part which is remote from the cylinder, said deep main chamber part being in direct communication with the cylinder so that ignited gases may travel simultaneously in three directions toward relatively shallow combustion chamber parts, one direction being in a relatively straight line toward the shallow combustion chamber portion over the cylinder and the other directions being in relatively straight lines toward the relatively shallow side combustion chamber parts.

6. In an internal combustion engine, a cylinder, a piston operating therein, a head formed with a combustion chamber, said chamber having a shallow portion over the cylinder and having a portion lying to one side of and opening into said cylinder, inlet and exhaust valves arranged side by side adjacent said cylinder and opening into said side combustion chamber portion, said combustion chamber portion having a main chamber part of relatively great depth extending transversely of the head toward the cylinder and having a relatively shallow part on each side of said main chamber part extending transversely of the head toward the cylinder, and a spark plug mounted in the end of said relatively deep main chamber part which is remote from the cylinder, one of said relatively shallow parts being positioned over the inlet valve, said deep main chamber part being in direct communication with the cylinder so that ignited gases may travel simultaneously in three directions toward relatively shallow combustion chamber parts, one direction being in a relatively straight line toward the shallow combustion chamber portion over the cylinder and the other directions being in relatively straight lines toward the relatively shallow side combustion chamber parts.

JOSEPH W. JAGERSBERGER.